Jan. 20, 1953

J. S. STEUBY 2,626,116

SELF-CENTERING CASTER MOUNTING
FOR AIRCRAFT LANDING WHEELS

Filed June 9, 1949

*INVENTOR.*
JOHN S. STEUBY
BY Bertram H. Mann Jr.

ATTORNEY

Jan. 20, 1953

J. S. STEUBY
SELF-CENTERING CASTER MOUNTING
FOR AIRCRAFT LANDING WHEELS 2,626,116

Filed June 9, 1949

*INVENTOR.*
JOHN S. STEUBY
BY Bertram H. Mann

ATTORNEY

Patented Jan. 20, 1953

2,626,116

UNITED STATES PATENT OFFICE 2,626,116

SELF-CENTERING CASTER MOUNTING FOR AIRCRAFT LANDING WHEELS

John S. Steuby, St. Louis, Mo.

Application June 9, 1949, Serial No. 97,963

7 Claims. (Cl. 244—103)

This invention relates to landing gear for airplanes and consists particularly in novel wheel mounting structure therefor.

Where the air strip on which an airplane must land is not parallel with the wind, the plane must come in at an angle to the axis of the strip such that the direction of movement of the plane modified by the wind produces a resultant travel axially of the air strip. The landing wheels, however, are rigidly aligned with the axis of the ship so that upon impact, a lateral force is applied through the wheel tires to the landing gear, sometimes resulting in damage to the gear. In order to avoid this difficulty, the pilot sometimes lands with his wings dipped into the wind so that the resultant slide tends to offset the wind drift. This results in the plane landing on one wheel and, frequently, in a damaging ground loop.

It is the main object of the present invention to provide an airplane landing wheel mounting which is able to align itself with or, in other words, caster into the direction of travel so as to avoid the mentioned strain upon the wheel and landing gear.

Another object is to provide such a wheel mounting which, though normally resiliently maintained parallel to the axis of the ship, may yield angularly as explained. These objects and other more detailed objects hereafter appearing are attained by the device illustrated in the accompanying drawings in which Fig. 1 is a diagrammatic representation of a plane landing upon an air strip at an angle to offset wind drift.

Figure 1:
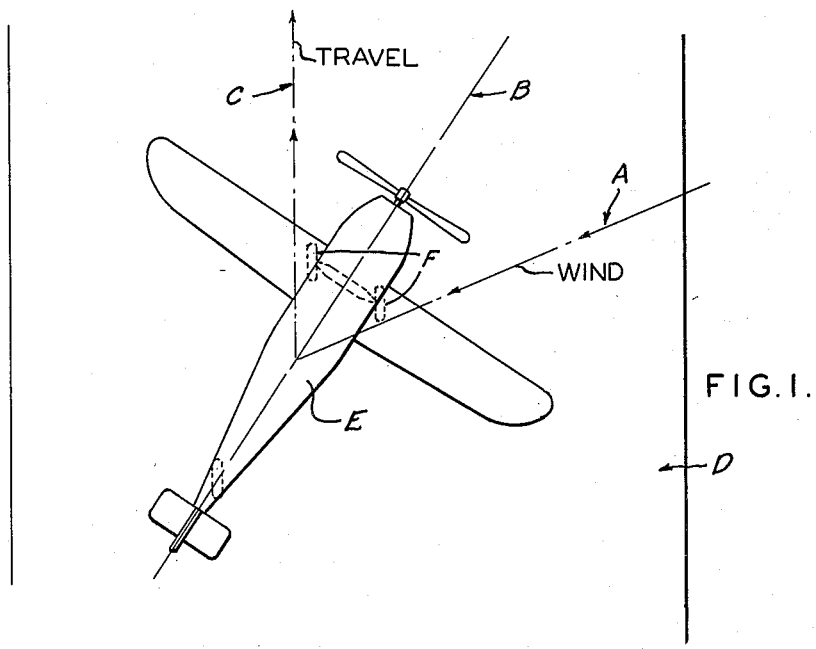

The diagram in Fig. 1 shows the wind direction at A, the line of airplane self-propelled motion at B, and the resultant travel at C in line with air strip D. The airplane E has running gear of any suitable type, including axles as at 6, usually stub axles, and with the novel castering wheels F, as herein described more fully.

Each wheel is mounted upon a main axle 6 carried by the landing gear. The axle has secured thereto by means of a taper pin 7, a cylindrical, central hub element 8 having a medial annular flange. The ends 8a of element 8 slidably receive cup-like, expansion shoes 9 and 10. The cups have hemispherical outer surfaces 9a and 10a and are constantly urged apart by means of multiple coiled springs 11 and 12 so as to bear against the ellipsoidal inner surface 13a, 14a of a casing shell formed of two halves 13 and 14 with rim flanges 15 and 16 secured together by bolts 17. The cups normally seat in the smaller ends of the casing to maintain the axle centered. The casing is cut out at 18 for the axle. While the casing is ellipsoidal as a whole, the opposite bearing surfaces 13a and 14a thereof are, preferably, spherical about longer radii and different centers than the opposing spherical surfaces 9a and 10a on expansion members 9 and 10.

Figure 2:
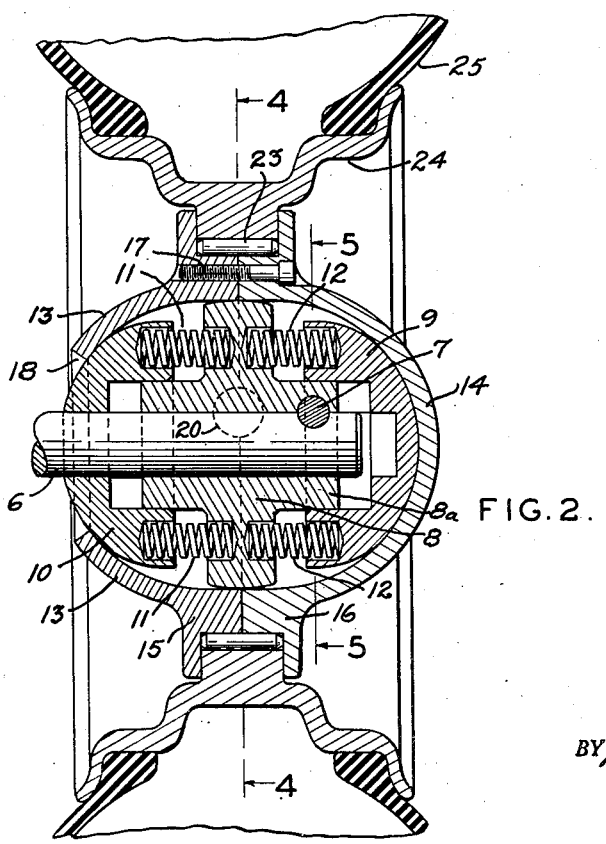
Fig. 2 is a horizontal center section taken on line 2—2 of Fig. 4 with the parts centered.
Figure 5:
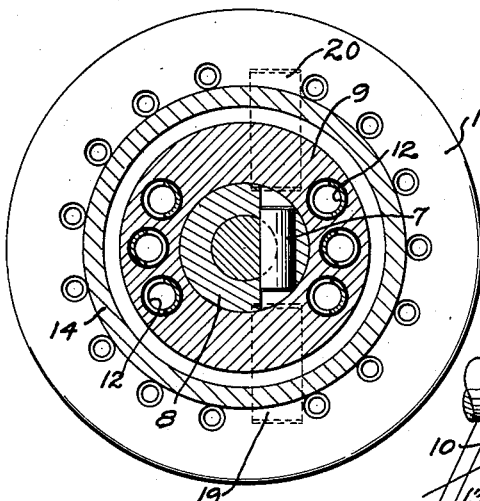
Figs. 4 and 5 are vertical, longitudinal sections taken on the corresponding section lines of Fig. 2.
Figure 4:
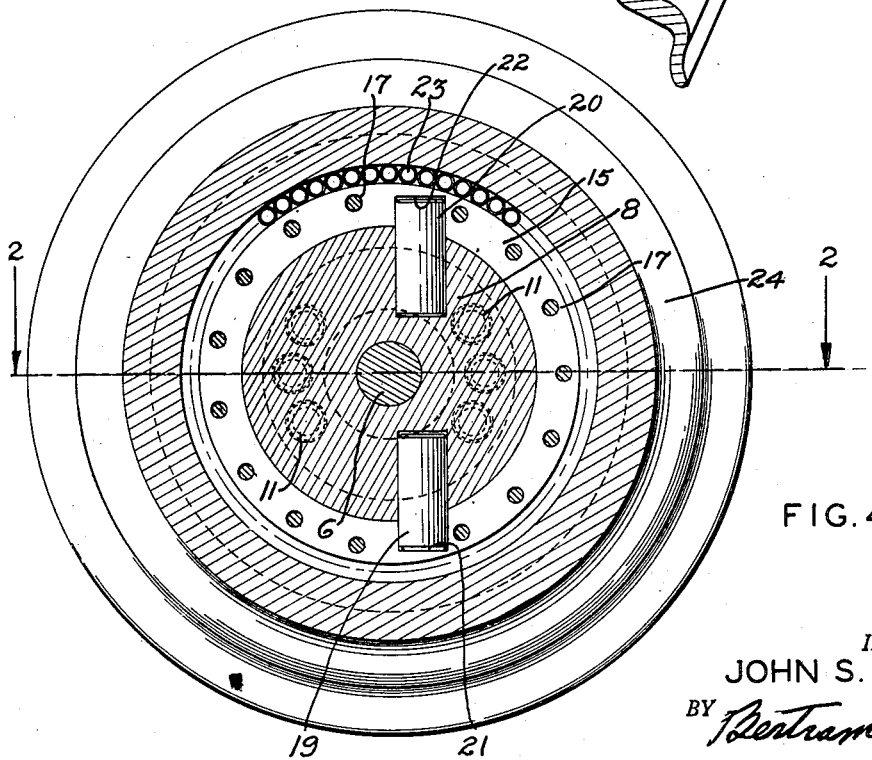

Flanged hub element 8 has aligned, outwardly opening pockets receiving oppositely extending pins 19 and 20 which are also received in suitable recesses 21 and 22 in the thickened abutting portions of casing flanges 15 and 16 to form castering axles. The axis of these pins, as best shown in Figs. 2 and 4, is located slightly forwardly of stub axle 6.

The thickened abutting portions of flanges 15 and 16 on the shell form, on their outer surfaces, a raceway for roller bearings 23 interposed between the shell and a complementary raceway on rim portion 24 of the landing wheel having the usual rubber tire 25.

Figure 3:
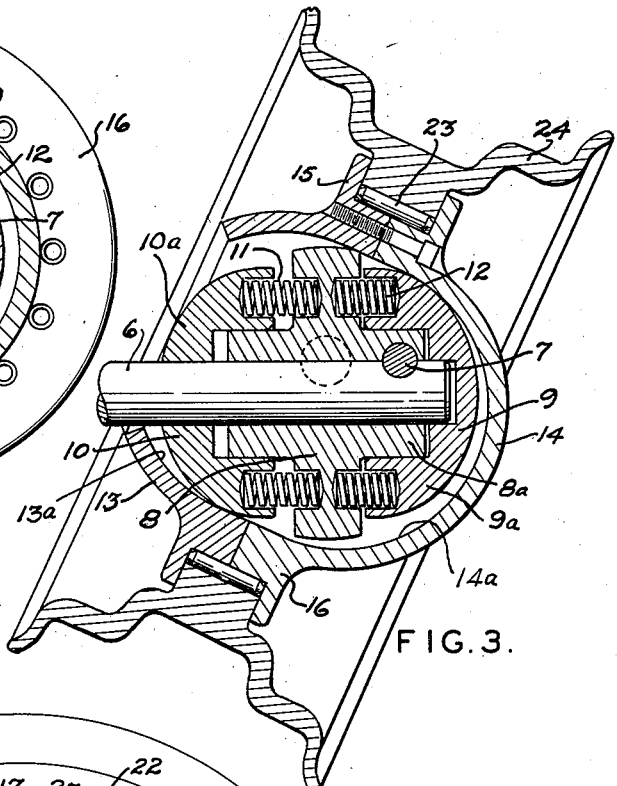
Fig. 3 is a section similar to Fig. 2, but showing the wheel angularly tilted.

In operation, the wheel is resiliently maintained aligned by opposed, coiled springs 11 and 12 which cause centering of cups 9 and 10 within ellipsoidal shell 14. When force is applied to the wheel tire, tending to swivel or caster the same, the wheel tilts about pins 19 and 20, as shown in Fig. 3. During this motion, the coiled springs 11 or 12 on one side are compressed, and the opposite springs expanded so that as soon as the castering force is relieved, the wheel resumes its normally aligned position.

Thus, the wheel automatically assumes a position in alignment with the direction of travel and maintains such alignment as the plane reduces speed and is swung about in taxi-ing to its parking location. Moreover, oscillation of the wheels is eliminated by the damping effect of the resilient mounting.

The novel castering wheel is shown constructed to be applied as a replacement to existing landing gear. However, where the gear is originally designed for these wheels, modifications will be apparent, as in the axle and central body member. Of course, the bearing parts may be replaceable and a braking arrangement may be incorporated, if desired.

The invention may be modified in these and other respects as will occur to those skilled in the art and the exclusive use of all modifications as come within the scope of the appended claims is contemplated.

I claim:

1. A caster mounting for aircraft landing wheels comprising a central hub element for direct attachment to and support of the aircraft, expansion members mounted on said element, springs constantly urging said members apart in the direction transversely of the aircraft, and a wheel-carrying casing closely confining said expansion members and capable of swivelling movement thereabout, said casing being ellipsoidal in horizontal section with its major axis transverse of the aircraft and said expansion members being normally spaced apart transversely of the aircraft and urged by said springs into positions aligned with said major axis of said casing.

2. A caster mounting for aircraft landing wheels comprising a wheel carrying casing with an ellipsoidal, inner surface, a central hub element within said casing, cup-like expansion members movably mounted on said body element and normally disposed along the major axis of said casing, and spring structure constantly urging said members oppositely into frictional engagement with said casing inner surface so as to resist swivelling of said casing about said expansion members.

3. A caster mounting for aircraft landing wheels comprising an axle, a flanged hub element rigidly secured to said axle, a pair of cup-shaped, expansion members slidably received on said hub element, a casing shell having an ellipsoidal, inner surface frictionally receiving said members, a wheel bearing on said shell, and springs constantly urging said expansion members oppositely against the inner surface of said shell, the outer surfaces of said members being spherical about shorter radii and different centers than the immediately abutting inner surfaces of said shell whereby said springs tend to center said members within said shell and to resist castering of the mounting.

4. A caster mounting for aircraft landing wheels comprising a central hub element, expansion shoe members movably mounted on said hub element, a casing shell with an ellipsoidal inner surface frictionally receiving said shoe members, an annular wheel bearing on said shell, means for urging said shoe members oppositely against said shell inner surface so as to center the same therein, and castering axle means connecting said hub element and said casing shell and journalled in at least one thereof, said axle means extending at a right angle to the axis of said wheel bearing and being spaced forwardly thereof with respect to the normal direction of movement of the mounting in operation.

5. A caster mounting for aircraft landing wheels comprising a central hub element with opposite cylindrical portions disposed transversely of the aircraft, cup-like expansion shoe members slidably received on said cylindrical portions of said hub element and with spherical outer walls, an elongated casing shell mounting an annular wheel bearing, said shell having spherical, inner surfaces opposing and of greater radii than said expansion member outer walls, springs urging said shoe members oppositely into frictional engagement with said shell surfaces so as to resiliently resist swivelling of said shell from its normal, centered position with respect to said shoe members, and castering axle means extending at a right angle to the axis of said wheel bearing and spaced forwardly thereof with respect to the normal direction of movement of the mounting in operation.

6. A wheel mounting as described in claim 5 including coiled compression springs reacting between said hub element and said shoe members and urging said members oppositely into frictional engagement with said shell, the spherical, inner surface portions of said shell being located on the major axis thereof so that said springs tend to maintain said shoe members centered within said shell.

7. A castering landing wheel for aircraft comprising a central, aircraft supporting hub, expansion shoes on opposite sides of said hub, a casing enclosing said shoes and hub and having a rotary wheel bearing, and springs urging said shoes apart and into frictional engagement with said casing, said casing having opposing, cup-like inner surfaces normally receiving said shoes and with their centers along a line disposed transversely of the aircraft, each surface having symmetrical portions diverging outwardly from the center thereof and the diverging portions of the respective casing surfaces extending toward each other to form opposite camming surfaces for normally, resiliently centering said casing and said wheel with respect to said shoes and said hub.

JOHN S. STEUBY.

REFERENCES CITED

The following references are of record in the file of this patent:

UNITED STATES PATENTS

| Number | Name | Date |
|---|---|---|
| 2,435,827 | Greubel | Feb. 10, 1948 |
| 2,489,115 | Wolf | Nov. 22, 1949 |
| 2,490,560 | Urquhart | Dec. 6, 1949 |
| 2,504,077 | Loudenslager | Apr. 11, 1950 |

FOREIGN PATENTS

| Number | Country | Date |
|---|---|---|
| 634,357 | Germany | Aug. 25, 1936 |